United States Patent [19]

DeJager

[11] Patent Number: 5,111,325
[45] Date of Patent: May 5, 1992

[54] F-θ LENS

[75] Inventor: Donald DeJager, Rochester, N.Y.

[73] Assignee: Eastman Kodak Company, Rochester, N.Y.

[21] Appl. No.: 422,350

[22] Filed: Oct. 16, 1989

[51] Int. Cl.$^5$ .......................... G02B 26/08; G02B 9/00
[52] U.S. Cl. ................................... 359/206; 359/208; 359/662
[58] Field of Search ............... 350/474, 449, 433, 434, 350/6.1–6.91, 415, 514, 463–473, 482, 483; 358/302; 359/196–226, 662, 754, 763–783

[56] References Cited

U.S. PATENT DOCUMENTS

| | | | |
|---|---|---|---|
| 3,701,588 | 10/1972 | Trebitz et al. | 350/215 |
| 4,277,128 | 7/1981 | Kawamura | 350/6.8 |
| 4,396,254 | 8/1983 | Shibuya | 350/463 |
| 4,401,362 | 8/1983 | Maeda | 350/6.8 |
| 4,715,697 | 12/1987 | John et al. | 350/514 |
| 4,755,030 | 7/1988 | Araki et al. | 350/6.8 |
| 4,756,583 | 7/1988 | Morimoto | 350/434 |
| 4,765,727 | 8/1988 | Mercado | 350/483 |
| 4,796,962 | 1/1989 | DeJager et al. | 350/6.8 |
| 4,821,113 | 4/1989 | McQuade et al. | 358/302 |
| 4,847,492 | 7/1989 | Houki | 350/6.8 |
| 4,848,885 | 7/1989 | Clark | 350/469 |
| 4,863,250 | 9/1989 | Ishizuka | 350/463 |
| 4,880,299 | 11/1989 | Hamada | 350/415 |
| 4,892,395 | 1/1990 | Suzuki et al. | 350/416 |
| 4,917,483 | 4/1990 | Nakao | 350/6.8 |
| 4,921,320 | 5/1990 | DeJager et al. | 350/6.5 |

Primary Examiner—Bruce Y. Arnold
Assistant Examiner—Thong Nguyen
Attorney, Agent, or Firm—Donald D. Schaper

[57] ABSTRACT

An f-θ lens is disclosed which is particularly suitable for use with a color laser printer in which beams of different wavelengths are combined into a single combined beam. The combined beam is scanned by a rotating polygon onto a receiving medium. The f-θ is adapted to operate with optics for shaping the beam in a scan direction prior to the polygon and a cylindrical element after the f-θ lens to image the beam in a cross-scan direction onto the receiving medium. In order to provide an f-θ lens which is color corrected, the lens includes means for correcting in a scan direction for lateral color aberrations in each of the beams, and means for correcting in a cross-scan direction for axial color aberrations in each of the beams.

7 Claims, 3 Drawing Sheets

F-θ LENS

CROSS REFERENCE TO RELATED APPLICATIONS

Reference is made to commonly-assigned U.S. patent application Ser. No. 07/422,382, entitled "Laser Printer," filed in the name of D. Kessler on even date herewith now U.S. Pat. No. 5,018,805.

BACKGROUND OF THE INVENTION

1. Field of the Invention

This invention relates to an f-θ lens, and more particularly, to an f-θ lens suitable for use in a diode laser printer which includes a rotating polygon scanner.

2. Description of the Prior Art

Laser printers are used in photography and in the graphic arts for printing on a receiving medium such as film. When such printers are used for color imaging, they generally include a separate light source for each of the three primary colors. Light beams from the separate sources are combined into a colinear combination beam, and this beam is then scanned over an angular range by a rotating polygon. An f-θ lens is located in the optical path between the polygon and the receiving medium.

The input beam to the polygon and to the f-θ lens would normally be collimated in all three colors or wavelengths. The f-θ lens would also normally be designed to correct both axial and lateral color at the image plane, assuming a collimated input beam.

Such an f-θ lens, however, may not be suitable for use with a polygon scanner which has pyramidal angle error on one or more of its individual facets. A facet having this type of error is tilted so that its face, if extended, would intercept the axis of rotation of the polygon. If there is no pyramidal angle error, the plane of the facet is parallel to the axis of revolution. In the case of zero pyramidal angle error, an input beam which lies in a plane perpendicular to the axis of rotation will, after reflection off the facet, remain in this plane. In the case of non-zero pyramidal angle error, the beam after reflection will no longer lie in this plane, and after passing through the f-θ lens, the beam will be focused at the image plane at a location either above or below the scan line; this is referred to as cross-scan error. If the input beam consists of three different colors or wavelengths, the amount of cross-scan error may be different for each wavelength. These wavelength-dependent cross-scan errors could cause a problem known as banding.

In U.S. Pat. No. 4,396,254, for example, there is disclosed an f-θ lens which includes means for color correction, over a wavelength region of 632.8 to 1064 nanometers. However, there is no suggestion in this patent that the disclosed lens is corrected for pyramidal angle error on a polygon facet, and thus, the lens would not be suitable for use in a laser color printer which uses a rotating polygon to scan the beam.

SUMMARY OF THE INVENTION

It is an object of the present invention to overcome the problems in the prior art discussed above and to provide an improved f-θ lens for a color laser printer.

In accordance with the present invention, there is provided an f-θ lens, the lens being adapted to receive an input beam which comprises a combination of beams each of which is at a predetermined wavelength and has a predetermined vergence in a scan direction, the lens comprising: means for correcting in a scan direction for lateral color aberrations of each of the beams at a receiving medium; and means for correcting in a scan direction for axial color aberrations of the beams at the receiving medium when at least one of the beams has a non-zero vergence.

In one embodiment of the present invention, the f-θ lens includes six lens elements arranged along an optical axis. The lens is color corrected for two types of color aberrations: lateral color in the Y-Z meridian, and axial color in the X-Z meridian. The lens is also adapted to use input beams of a non-zero vergence to correct for axial color in the Y-Z meridian.

A principal advantage of the lens of the present invention is that it will operate as an f-θ lens at three different wavelengths simultaneously so as to superimpose the image spots on each other, and it will operate satisfactorily with a polygon having a small amount of pyramidal angle error on the facets.

Another advantage of the lens is that is consists of spherical surfaces on relatively low cost glass, and thus, it can be readily manufactured at a reasonable cost.

Other features and advantages will become apparent with reference to the following description of the preferred embodiments when read in light of the attached drawings.

DESCRIPTION OF THE PREFERRED EMBODIMENTS

Figure 2:
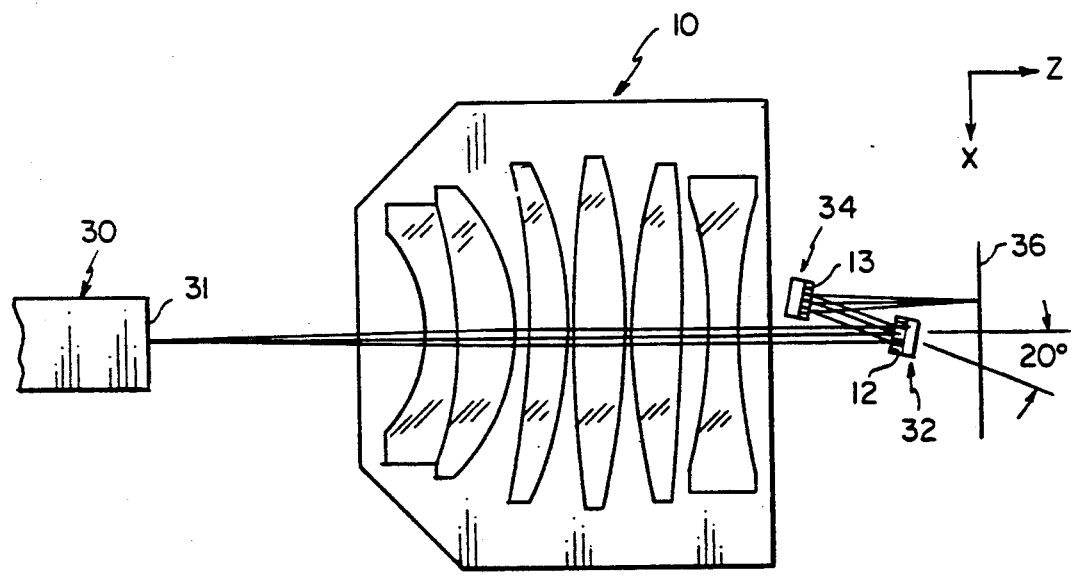
FIG. 2 is a schematic elevational view showing the f-θ lens in combination with a plano mirror and a cylinder mirror.

The optical axis of the f-θ lens of the present invention extends in a direction referred to herein as the Z direction. The f-θ lens has particular optical characteristics in two directions normal to the optical axis. One direction normal to the optical axis is referred to as the X direction, as shown in FIG. 2, and the other direction normal to the optical axis is referred to as the Y direction. (See FIGS. 3a-3c.) When the f-θ lens is used as a scan lens, a beam is scanned through the Y-Z meridian. Thus, the scan direction is in the Y direction, and the cross-scan direction is in the X direction.

The f-θ lens described herein is particularly suitable for use in a laser printer as disclosed, for example, in the aforementioned U.S. patent application, entitled "Laser Printer", in the name of D. Kessler. As disclosed in the Kessler application, the laser printer comprises three diode lasers which operate at 750, 810, and 870 nanometers and generate coherent infrared beams. The beams are optically combined so as to travel down a common axis, and the combined beam is directed toward a spinning polygon deflector. Upon reflection at any polygon facet, the beam enters the f-θ scan lens as it is being scanned in a plane which is perpendicular to the axis of rotation of the polygon.

An f-θ lens for a laser printer of the type described above should produce a single scanning spot containing the three wavelengths at the image plane. The spot should ideally travel in a straight line, at a uniform velocity, and not change its size and shape as it travels down the line. The spot should ideally have an approximately circular shape, with an energy distribution which is approximately gaussian. The ideal diameter of the spot at the exp(−2) power level would be about 10 to 12 microns, in order to achieve sufficient resolution in the film image. The length of the scan line can be, for example, 24 mm.

Scanning systems using a spinning polygon are subject to an image defect known as banding, which is most easily seen in areas of the image where it is free of subject detail, i.e., a blank wall or a cloud free sky scene. Light and dark bands, which are not part of the desired image, will appear in these areas. These bands are caused by repetitive non-uniform spacing of the scan lines. The banding is caused by a facet, or facets, on the polygon which are tilted slightly out of position. Thus, every time the facet which is out of position comes around, it will cause the beam to move ever so slightly out of the plane of the rotating beam. After going through the f-θ lens, this beam will land in a slightly different position on the image plane, generating what is known as "cross-scan" error, since the position error is in a direction which is perpendicular to the scan line. An f-θ lens must function with the other elements in the optical system to produce an image which is free from banding when a "good" polygon is used, that is, a polygon in which pyramidal angle errors on the polygon facets do not exceed +/−15 arc seconds, as measured with respect to the axis of rotation of the polygon.

A further requirement of an f-θ scan lens is that it be readily manufacturable at a reasonable cost. This requires that the lens have spherical surfaces on relatively low cost glass.

Figure 1:
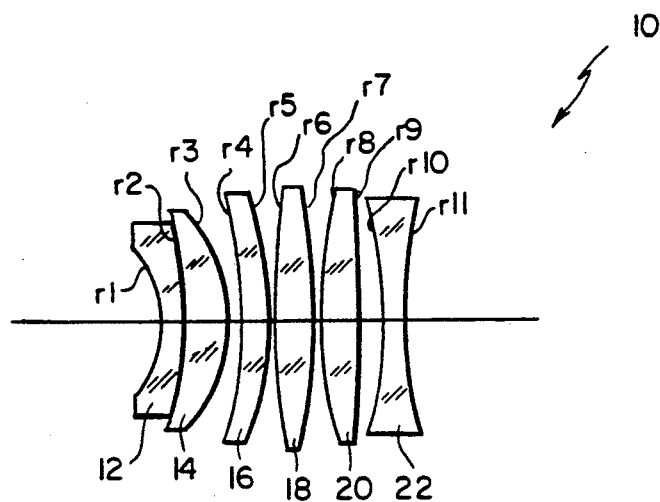
FIG. 1 is a top plan view showing the lens element arrangement in the f-θ lens of the present invention.

In FIG. 1, there is shown a f-θ lens 10 which is constructed in accordance with the present invention. Lens 10 comprises a doublet which includes a meniscus negative element 12 and a meniscus positive element 14, a meniscus positive element 16, a double convex positive element 18, a double convex positive element 20, and a double concave negative element 22. In one exemplary lens 10, the lens elements are formed of Schott glass with element 12 being an SF 14 type, elements 14, 16 18 and 20 being an LAKN22 type, and element 22 being an S11 type. The details of the elements in lens 10 are shown in TABLE I.

TABLE I

| SURF. | RADIUS | THICKNESS | GLASS |
|---|---|---|---|
| Entrance Pupil | | 30.800 | |
| r1 | −13.9300 | 2.500 | 762265 |
| r2 | −50.0263 | 6.900 | 651559 |
| r3 | −20.6003 | 0.500 | |
| r4 | −119.667 | 5.320 | 651559 |
| r5 | −36.5497 | 0.500 | |
| r6 | 139.895 | 5.850 | 651559 |
| r7 | −64.1175 | 0.500 | |
| r8 | 63.2356 | 5.190 | 651559 |
| r9 | −269.725 | 2.517 | |
| r10 | −93.2760 | 4.280 | 785258 |
| r11 | 71.0150 | | |

Figure 3A:
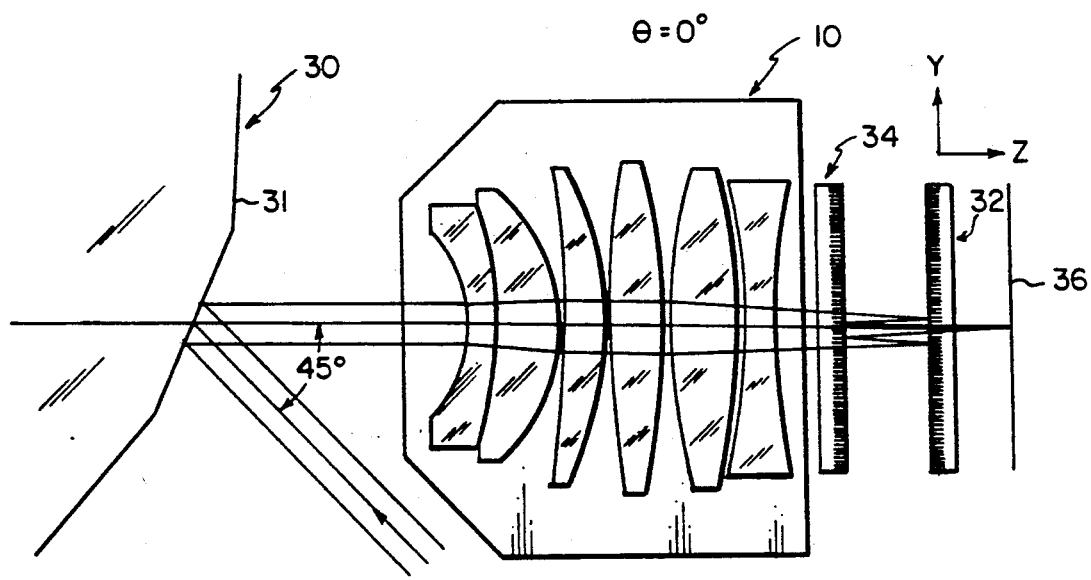
FIGS. 3a-3c are plan views of the combination in FIG. 2 and show the path of the light beam at scan angles of 0°, −15°, and +15°, respectively.
Figure 3B:
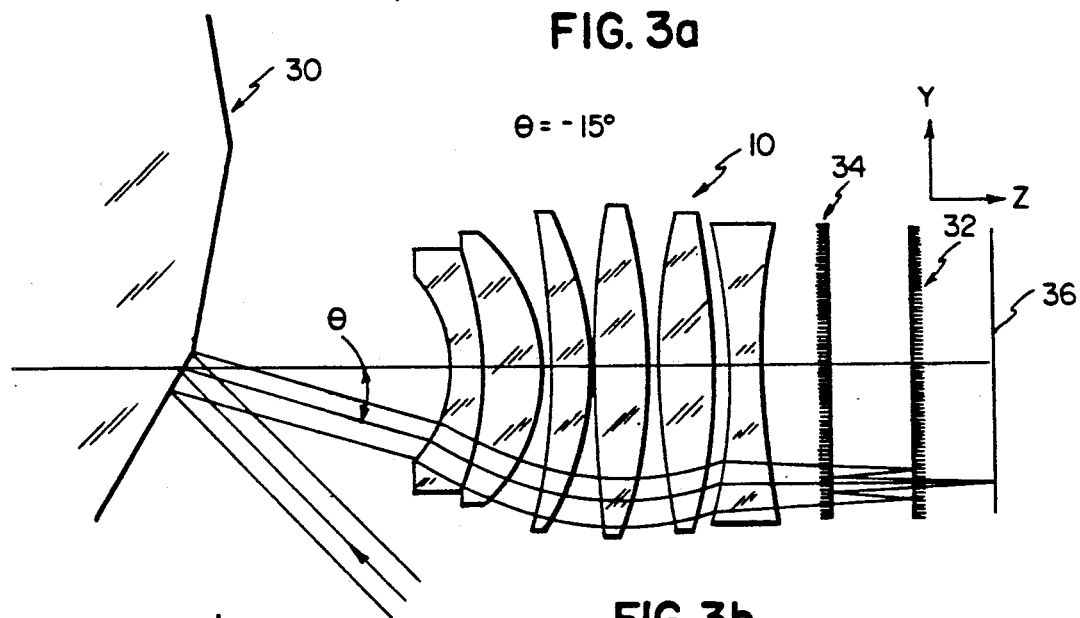
Figure 3C:
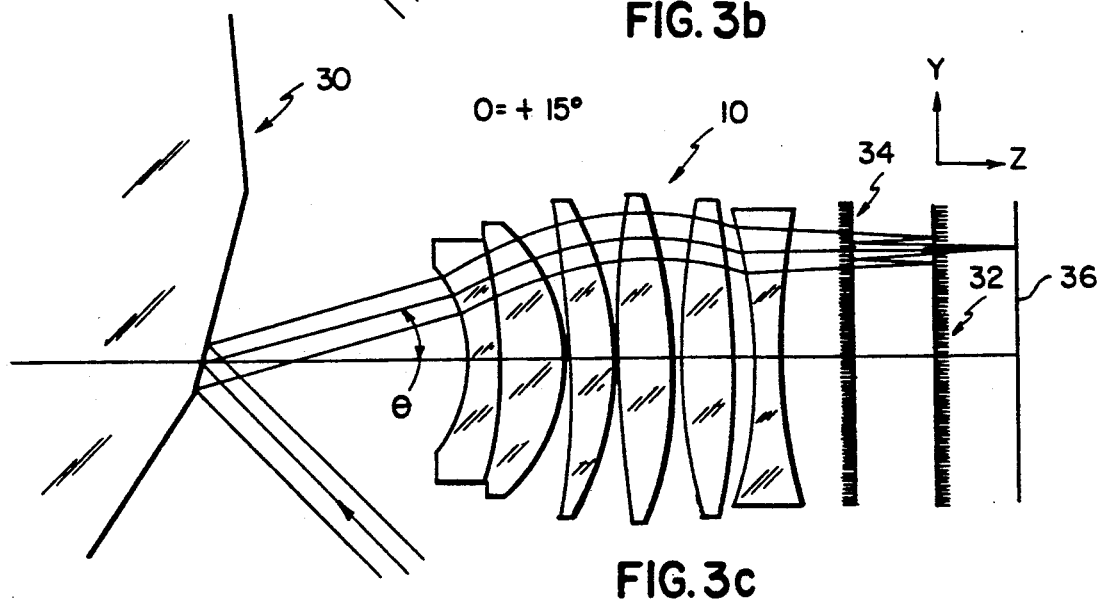

In the use of the f-θ lens 10 in a color laser printer, the lens 10 is arranged in the optical path as shown in FIG. 2. In FIG. 2, a light beam containing the three wavelengths is directed to the lens 10 by a polygon 30. The collimated beam from the f-θ lens is reflected by a plano mirror 32 onto a cylindrical mirror 34 which images the beam spot on the receiving medium 36. Plano mirror 32 is tilted at an angle of +10 degrees, and cylinder mirror 34 is tilted at an angle of −10 degrees. Cylinder mirror 34 has a radius of 37.633 mm. A reflecting surface 42 of plano mirror 32 is located in the optical path at a distance of 16.9264 mm from surface r11 of lens 22 and at a distance of 10.000 mm from a surface r13 of mirror 34. Surface r13 of mirror 34 is located 18.5305 mm from receiving medium 36. The position of the beam on the receiving medium 36 is shown in FIGS. 3a-3c for a 0° scan angle, a −15° scan angle, and a +15° scan angle, respectively.

There are two kinds of color aberrations in any lens: axial color and lateral color. Axial color causes light of different wavelengths to come to a focus at different distances from the back of the lens. This phenomenon is most easily measured in the center of the image where the beams traveling down the optical axis come to a focus, and for this reason is referred to as axial color. However, since this color aberration also occurs all over the field of the lens, not just on the axis, the term is somewhat of a misnomer.

Lateral color is the variation in image height of focused spots having different wavelengths, or colors, taken in a specified focal plane. For example, in normal photographic objectives for use in color photography, lateral color is typically measured by Y'(486.1 nm) −Y'(656.3 nm); this is the difference in image height, taken in the gaussian focal plane for 546.1 nm, between the blue point image and the red point image.

Lateral color, as opposed to axial color, only occurs away from the optical axis, out in the field of the lens. Usually, the farther away from the axial image point, the greater the amount of lateral color. Thus, the largest amount of lateral color often occurs near the edge of the field of view of the lens.

Since axial color is a focus-related phenomenon, it is caused not only by aberrations in the lens itself but also by the vergence of the input light beam. The word "vergence" refers to whether the input beam is collimated, converging, or diverging. A collimated beam has zero vergence, a diverging beam is said to have negative vergence, and a converging beam has positive vergence. Vergences are measured in diopters. One meter away from a point source of the light, the vergence of the beam is −1 diopter. If at this location a positive lens is placed, having a power of +2 diopters, the beam coming out of the lens will be converging, having a vergence of +1 diopter. As this beam travels towards its focal point, its vergence gets stronger and stronger, and goes to +infinity at the focal point. When it emerges from its focal point, it becomes diverging, with a vergence of −infinity. The vergence concept, thus, is not useful near a focal point, since it switches from +infinity to −infinity. However, for beams which are collimated or nearly collimated, the vergence concept is quite useful. (More information on vergence can be found in the book by L. C. Martin, entitled "Technical Optics", Volume 1, page 31.)

In the laser printer shown in the aforementioned U.S. patent application filed in the name of Kessler, three beams at 750, 810, and 870 nanometers are independently generated by laser diodes; each beam goes through its own collimator lens and also through a series of lenses which shape the beam—make it have the desired cross-sectional dimensions, and also have the desired vergences, where the beams reach the polygon position. An f-θ lens can be said to have the color aberration of axial color if, for example, a perfectly collimated 750 nm input beam comes to a focus farther from the back of the lens than a perfectly collimated 870 nm input beam. This would be called positive axial color because the short wavelength radiation came to a focus beyond where the long wavelength radiation came to a focus. If the input beam of a laser printer at 810 nm is perfectly collimated, the 870 nm beam is slightly diverging (−), and the 750 nm beam is slightly converging (+), and if the amounts of vergence in the 870 and 750 nm beams are just right, the vergences can serve to counteract the axial color in the lens, and all three beams can be brought to a focus in the same focal plane. It is this concept which was used in the present invention. Axial color in the Y-Z meridian was corrected by adapting the lens to handle individual input beams having non-zero vergences in the Y-Z meridian.

The other color aberration, lateral color, must be very well corrected in order to produce one scanning spot of "light," not three separated spots of "light." The desired spot size is around 10 to 12 micrometers, assuming that spot size is defined as the diameter between the $\exp(-2)$ power points. The lateral color of lens 10, at various scan angles in the field of view, is as shown in TABLE II. (It is assumed that the vergences of the input beams are adjusted so that all three beams will focus in the same plane, and that the effect of the polygon rotation is taken into account.)

TABLE II

| Angle    | Y' @ 750 nm   | Y' @ 810 nm   | Y' @ 870 nm   |
|----------|---------------|---------------|---------------|
| −15 deg. | −12.00230 mm  | −11.99941 mm  | −12.00171 mm  |
| −10 deg. | −8.00226      | −8.00075      | −8.00251      |
| −5 deg.  | −4.00158      | −4.00097      | −4.00193      |
| 0 deg.   | 0.0           | 0.0           | 0.0           |
| +5 deg.  | 4.00151       | 4.00097       | 4.00196       |
| +10 deg. | 8.00195       | 8.00075       | 8.00263       |
| +15 deg. | 12.00158      | 11.99948      | 12.00206      |

It will be seen in Table II that the "spot smear" due to lateral color only, at +/−15 degrees, is on the order of 0.002 mm to 0.003 mm, roughly a quarter of the desired spot diameter.

In a laser printer of a type which can incorporate the f-θ lens of the present invention, the system parameters can be as follows:
Wavelengths: 750, 810, and 870 nanometers.
Scan Length: 24 mm.
Polygon Duty Cycle: 0.75.
Polygon Diameter: 110 mm across the facets.
Number of facets: 18.
Total scan angle: 30 degrees (+/−15 degrees with respect to optical axis.)
Beam input angle: 45 degrees from optical axis of f-θ lens.
Desired gaussian beam radius at image: 0.0055 mm at the $\exp(-2)$ power points, for 810 nm radiation. At 750 and 870 nm, the beam radii would be scaled in proportion to the square roots of the wavelengths.

The above descriptions of color aberrations and system parameters all apply in the Y-Z meridian. In the X-Z meridian, a different situation exists: in order to eliminate cross-scan error due to small polygon pyramidal angle errors, at any of the three wavelengths, it is necessary that axial color be corrected for the optical system between the polygon and the receiving medium. In this case, the polygon must be conjugated to the receiving medium. This means that there must be an object and image relationship between the polygon and the receiving medium. However, the polygon is rotating, and this particular relationship is enforced at the central point of the scan, that is, where the scan angle is said to be zero.

As shown in FIG. 2, the input beam, in the X-Z meridian, is focussed exactly at the polygon facet, assuming the scan angle is set at zero. The beam is reflected by the facet 31 and it is then transmitted through the f-θ lens and becomes collimated. From plano mirror 32, the beam goes to cylindrical mirror 34, which has power only in the X-Z meridian. The beam focuses again at the receiving medium. Thus, there is a focal point at both the polygon facet and at the receiving medium, and the polygon is conjugated to the receiving medium. As a result, if the polygon facet had been tilted slightly in the X-Z meridian, that is, around the "object" point, the path of the rays through the optical system would be slightly different from that shown in the figure, but the rays will all go to the same "image" point, and the cross-scan error will be zero.

As mentioned above, for this system to work successfully at all three wavelengths, the axial color must be corrected, so that the beam between the lens and the mirror system is exactly collimated in all three wavelengths. Note that the plano mirror 32 and cylinder mirror 34 have zero contribution to axial color. The f-θ lens 10 does fulfill the requirement for zero axial color, in the X-Z meridian, with the optical arrangement as shown in FIG. 2.

It is noted that the axial color in the Y-Z meridian is not corrected to zero, but in fact amounts to 0.0572 mm, for wavelengths 750 and 870 nm. It is this lack of axial color correction, in the Y-Z meridian, which requires the input beams at 750 and 870 nm to have non-zero vergences, as explained above.

In Table III, the computed cross-scan image displacements for the chief (central) rays of the beams are shown, assuming a pyramidal angle tilt of 15 arc seconds at the polygon facet. It will be seen that the results are practically identical at all three wavelengths, and that all the cross-scan displacements are certainly well within acceptable limits.

TABLE III

|            | Cross-scan displacement at |            |            |
|------------|----------------------------|------------|------------|
| Scan Angle | 750 nm                     | 810 nm     | 870 nm     |
| −15 degrees| −.000007 mm                | −.000007 mm| −.000007 mm|
| −10        | −.000003                   | −.000003   | −.000003   |
| −5         | −.000001                   | −.000001   | −.000001   |
| 0          | 0.0                        | 0.0        | 0.0        |
| 5          | 0.0                        | .000001    | 0.0        |
| 10         | 0.0                        | 0.0        | 0.0        |
| 15         | −.000002                   | −.000002   | −.000002   |

In order for f-θ lens 10 to produce the desired results at the receiving medium, a beam shaper is needed which will combine the three beams, having wavelengths 750, 810 and 870 nm, so that they follow a common path into the system and so that each of the beams will have the required gaussian beam characteristics at the input to the lens. One example of a beam shaper which will produce these results is shown in the aforementioned U.S. patent application entitled "Laser Printer."

Figure 4:
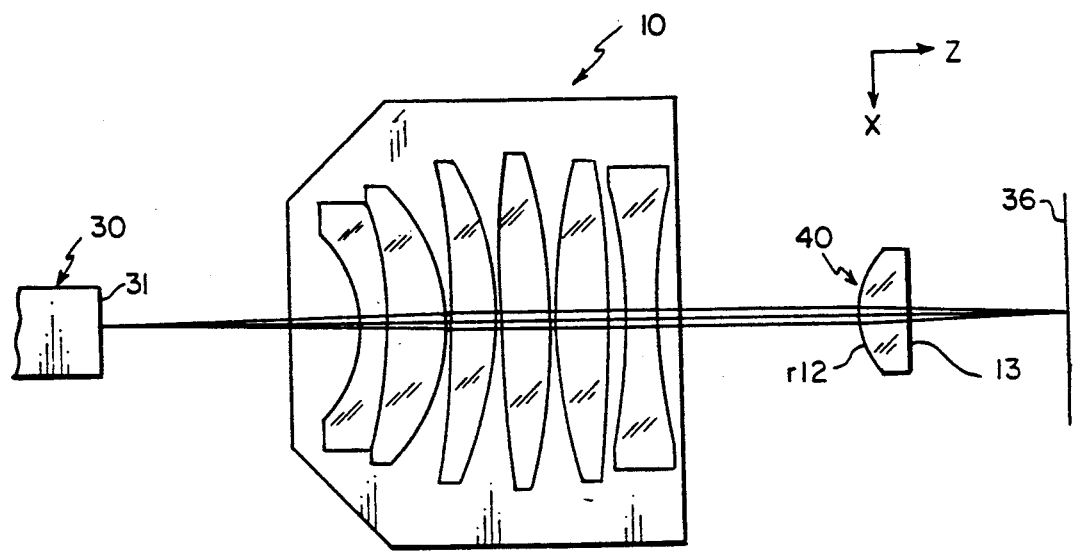
FIG. 4 is a schematic elevation view showing the f-θ lens in combination with a cylinder lens.
Figure 5:
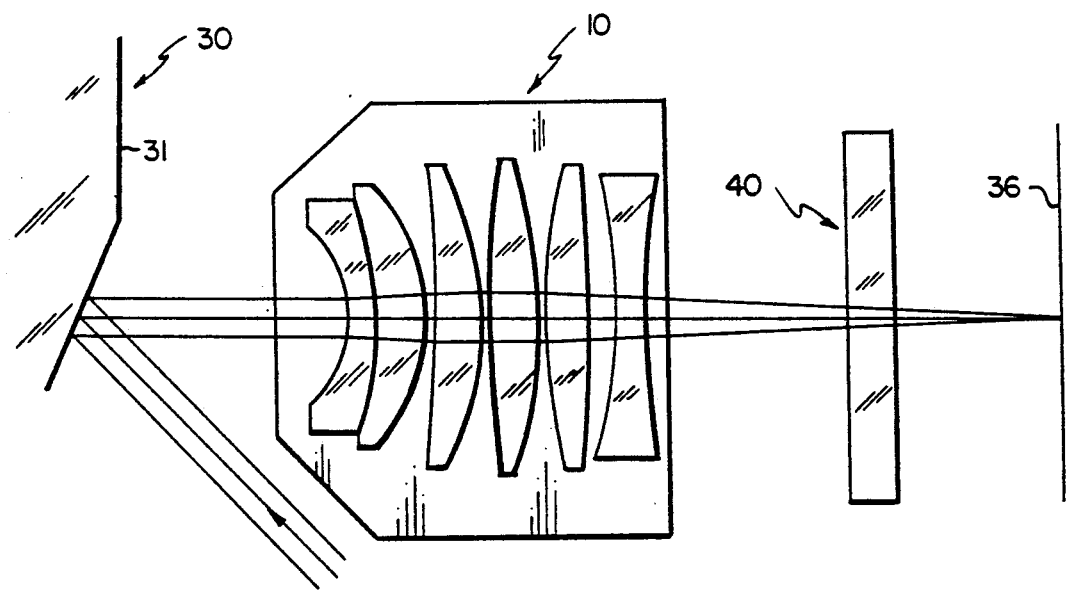
FIG. 5 is a plan view of the combination shown in FIG. 4.

As shown in FIGS. 4 and 5, f-θ lens 10 can be used with a cylinder lens 40, instead of plano mirror 32 and cylinder mirror 34. A suitable cylinder lens for use with lens 10 is formed of BK7 glass, has a thickness of 5.75 mm, and the radius of curvature r12 of 11.48 mm. Such a lens can be a cylinder lens, catalog no. 34-6577, sold by Ealing Electro-Optics, Inc. Lens 40 can be located in the optical path with surface r12 being 22.9728 mm from surface r11 of lens 22 and plano surface 13 being 18.6776 mm from receiving medium 36. The use of cylinder lens 40 rather than the plano mirror 32 and cylinder mirror 34 produces results which are generally similar to the data given herein for the system shown in FIG. 2. There are, however, advantages in using the cylinder lens 40 in that more space is available between lens 10 and the receiving medium 36 and the difficulty of aligning mirrors 32 and 34 is eliminated.

The f-θ scan lens of the present invention is intended for use at three wavelengths in the infrared: 750 nm, 810 nm, and 870 nm. It is adapted to be used with a beam shaping pre-scan optical system and a polygon scanner which: at 810 nm, produces a collimated truncated gaussian beam in the Y-Z (scan) meridian; at 750 nm, produces a converging truncated gaussian beam in the Y-Z (scan) meridian; and at 870 nm, produces a diverging truncated gaussian beam in the Y-Z (scan) meridian. These beams are optically combined to travel along a common path towards a polygon facet where they are reflected and caused to rotate through an angular range of +/−15 degrees. The f-θ scan lens brings these beams to a focus at the image plane along a straight line 24 mm long. The three beams are superimposed on each other at the focal point; this requires that lateral color for the f-θ scan lens be very well corrected. The f-θ scan lens by itself is not corrected for axial color (in the Y-Z meridian), but when used with the pre-scan optics (described above), the axial color is such that the three beams come to a waist focus in the same focal plane. In the X-Z meridian, the f-θ scan lens conjugates the polygon facet to the image plane, in all three wavelengths: this requires the use of an auxiliary cylindrical lens or mirror element, having power in only the X-Z meridian. Assuming the "object" is at the polygon facet, the axial color in the X-Z meridian for the f-θ lens is zero; it is also zero for the cylindrical mirror and, hence, the conjugation holds at all three wavelengths.

The invention has been described in detail with particular reference to the preferred embodiment thereof, but it will be understood that variations and modifications can be effected within the spirit and scope of the invention.

I claim:

1. An f-θ lens, said lens being adapted to receive an input beam which comprises a combination of beams each of which is at a predetermined wavelength and has a predetermined vergence in a scan direction, said lens comprising:
   means for correcting in a scan direction for lateral color aberrations of said beams at a receiving medium; and
   means for correcting in a scan direction for axial color aberrations of said beams at the receiving medium when at least one of said beams has a non-zero vergence.

2. An f-θ lens, as defined in claim 1, wherein each of said beams has a wavelength in the infrared.

3. An f-θ lens, as defined in claim 2, wherein said input beam is a combination of one beam having a wavelength of about 750 nm, a second beam having a wavelength of about 810 nm, and a third beam having a wavelength of about 870 nm.

4. An f-θ lens, as defined in claim 3, wherein in the scan direction said one beam has a positive vergence, said second beam has zero vergence, and said third beam has a negative vergence.

5. An f-θ lens comprising in combination a doublet which includes a meniscus negative element and a first meniscus positive element, a second meniscus positive element adjacent said first meniscus positive element, a first double convex positive element adjacent said second meniscus positive element, a second double convex positive element adjacent said first double convex positive element, and a double concave negative element adjacent said second double convex positive element.

6. An f-θ lens, as defined in claim 5, wherein numerical data of the lens are as follows:

| SURF. | RADIUS | THICKNESS | GLASS |
|---|---|---|---|
| Entrance Pupil | | 30.800 | |
| r1 | −13.9300 | 2.500 | 762265 |
| r2 | −50.0263 | 6.900 | 651559 |
| r3 | −20.6003 | 0.500 | |
| r4 | −119.667 | 5.320 | 651559 |
| r5 | −36.5497 | 0.500 | |
| r6 | 139.895 | 5.850 | 651559 |
| r7 | −64.1175 | 0.500 | |
| r8 | 63.2356 | 5.190 | 651559 |
| r9 | −269.725 | 2.517 | |
| r10 | −93.2760 | 4.280 | 785258 |
| r11 | 71.0150 | | | where r1–r11 represent radii of curvature of the respective lens elements.

7. An F-θ lens, said lens being adapted to be used in the optical path of a laser printer comprising a rotatable polygon scanner which provides an input beam composed of a plurality of beams of different wavelengths to the lens and a cylindrical optical element which receives the beam from said lens and directs the beam onto a receiving medium, said lens comprising:
   means for correcting in a scan direction for lateral color aberrations of each of said beams; and
   means operable with said cylindrical optical element for correcting in a cross-scan direction for axial color aberrations in each of said beams, said means operable with said cylindrical optical element including means for collimating said beam in the cross-scan direction in all of said wavelengths.

* * * * *